United States Patent [19]

Graham

[11] Patent Number: 4,730,510

[45] Date of Patent: Mar. 15, 1988

[54] PUSH-PULL CABLE APPARATUS

[76] Inventor: Dennis I. Graham, 2955 Revenna Rd., Hudson, Ohio 44236

[21] Appl. No.: 851,633

[22] Filed: Apr. 14, 1986

Related U.S. Application Data

[63] Continuation of Ser. No. 431,416, Apr. 30, 1982, abandoned.

[51] Int. Cl.$^4$ .............................................. F16C 1/10
[52] U.S. Cl. ..................... 74/502; 74/501 R; 403/233; 285/4
[58] Field of Search ........ 74/500.5, 501.5 R, 501.5 H, 74/501.6, 502, 502.4, 502.5, 502.6; 403/299, 343, 3; 285/3, 4

[56] References Cited

U.S. PATENT DOCUMENTS

| | | | |
|---|---|---|---|
| 2,899,836 | 8/1959 | Cushman et al. | 74/502 |
| 3,000,231 | 9/1961 | Cochran | 74/502 |
| 3,169,409 | 2/1965 | Babacz | 74/502 |
| 3,287,990 | 11/1966 | Ellinger | 74/501 R |
| 3,289,491 | 12/1966 | Conrad | 74/501 R |
| 3,320,665 | 5/1967 | Morse | 74/501 R |
| 3,516,299 | 6/1970 | Conrad | 74/501 R |
| 3,587,341 | 6/1971 | Fiddler | 74/501 R |
| 3,654,965 | 4/1972 | Gramain | 138/89 |
| 3,662,617 | 5/1972 | Bennett et al. | 74/501 R |
| 3,835,615 | 9/1974 | King | 285/4 |
| 3,855,817 | 12/1974 | Stuemky et al. | 74/501 R |
| 3,945,268 | 3/1976 | Ion et al. | 74/501 R |
| 3,955,441 | 5/1976 | Johnson | 74/501 R |
| 3,960,032 | 6/1976 | Schiff | 74/501 R |
| 3,985,041 | 10/1976 | Gilmore | 74/501 P |
| 3,988,943 | 11/1976 | Orcutt | 74/501 P |
| 4,050,327 | 9/1977 | Thomas et al. | 74/502 |
| 4,161,993 | 7/1979 | Pitrat | 74/501 R |
| 4,173,157 | 11/1979 | Miller et al. | 74/501 R |
| 4,175,450 | 11/1979 | Bennett | 74/501 P |
| 4,177,691 | 12/1979 | Fillmore | 74/501 P |
| 4,238,975 | 12/1980 | Jones | 74/502 |
| 4,304,148 | 12/1981 | Hamman | 74/501 R |
| 4,304,149 | 12/1981 | Heimann | 74/501 R |

FOREIGN PATENT DOCUMENTS

| | | | |
|---|---|---|---|
| 2515542 | 10/1976 | Fed. Rep. of Germany | 74/502 |
| 3292211 | 5/1930 | United Kingdom | 74/502 |
| 781689 | 8/1957 | United Kingdom | 74/502 |
| 1000550 | 8/1965 | United Kingdom | 74/502 |

Primary Examiner—Gary L. Smith
Assistant Examiner—Vinh Luong
Attorney, Agent, or Firm—James Creighton Wray

[57] ABSTRACT

A control cable assembly has variable travel length and variable types of end fittings. Interchangeable rods and hubs of varied configuration and length are selectively screwed onto the threaded heads of connectors fixed to the ends of the core and conduit respectively. Hub liners are snapped off at grooves to desired lengths and are positioned between the core and hub.

4 Claims, 10 Drawing Figures

PUSH-PULL CABLE APPARATUS

This application is a continuation of application Ser. No. 431,416, filed Sept. 30, 1982, now abandoned.

BACKGROUND OF THE INVENTION

This invention relates generally to control cables and more particularly has reference to a universal control cable having variable travel length and variable types of end fittings.

Conventional control cables have a flexible core slidably supported within a flexible conduit. A rigid actuator rod extends from the end of the core through a rigid hub on the end of the conduit and is connected to a source of power which imparts axial movement to the actuator and core.

The actuator and hub are commonly referred to as end fittings. Various sizes and types of end fittings are known. Examples include clamp ends, bulkhead ends, remote valve control input and output ends, modulator cable ends, vernier ends and positive lock ends. The configuration and size of the end fitting determines the suitability of the cable assembly for a given application. The end fitting also determines the travel length of the cable assembly.

It is current practice to permanently fix the end fittings to the core and conduit during manufacture. As a result, existing cables are of a fixed type and have a fixed travel length. Distributors who supply control cables to users having differing needs are thus forced to stock large inventories of complete cable assemblies for each different type and travel length of control cable. This can cause serious problems.

Similar problems are experienced by a user who has a need for several different types of control cables. He must stock a separate inventory of complete cable assemblies for each of his needs. In addition, he will be forced to replace entire cable assemblies if he has an application which requires different types of control cables at different times.

A need exists for a universal cable which can be readily adapted to different uses in the field.

Pertinent U.S. and foreign patents are found in Class 74, subclasses 486, 487 and 501–503; Class 138, subclasses 118, 137 and 140; and Class 403, subclass 49 of the official classifications of patents in the U.S. Patent and Trademark Office.

Examples of pertinent patents are U.S. Pat. Nos.
3,287,990
3,945,268
3,960,032
3,393,587
4,161,993
4,238,975
4,177,691
3,955,441
3,985,041
3,289,491
3,411,373
4,175,450
4,173,157
3,855,817
4,304,148
3,320,665
3,516,299
3,587,341
4,203,430
3,988,943
3,662,617
4,304,149

U.S. Pat. No. 3,287,990 shows threads at distal ends of hub assemblies and at distal ends of rods. In the hub assembly, a cylindrical member is threaded onto a tubular member and the tubular member is part of the hub assembly which is crimped onto the conduit.

U.S. Pat. No. 3,985,041 has threaded connectors crimped on ends of conduits for receiving an adapter. A threaded connector crimped onto the core receives the threaded end of a core from a second push-pull cable.

U.S. Pat. No. 3,320,665 shows a fitting having a plurality of annular grooves which are crimped down onto the outer cover of the conduit to effect a seal between the fitting and the cover.

The remaining patents are less pertinent.

None of the cited patents discloses a control cable assembly having variable end fittings.

SUMMARY OF THE INVENTION

The present invention overcomes the problems which exist in the prior art and provides a universal cable having variable end fittings.

Specifically, the present invention reduces cable inventory requirements by permitting one core-conduit subassembly to be modified in the field by adding end fittings of various type and various travel length. Each subassembly has threaded end connectors at the ends of the conduit and core. An actuator and a hub selected according to desired configuration and travel length are screwed onto the core connector and conduit connector respectively to provide the desired end fitting. It is only necessary to stock limited numbers of subassemblies.

To reduce the number and the cost of hub assemblies which must be stocked, the present invention further provides adjustable hub liners which are separate from the hubs. The hub liners have grooves or scores so that they may be snapped off to desired lengths. A given hub body can thus be provided with different types and lengths of liners and a given liner can be adapted for use with any hub body.

An additional advantage of having a hub liner which is separate from the hub body is that the desired close fit of the liner about the core can be maintained notwithstanding the interchangeability of the hub body. During manufacture, the liner can be placed on the core of the subassembly before the end connector is attached to the core. The hub body is then slid over the core end connector and brought into alignment with the liner. If, on the other hand, the liner was attached to the hub body, the inside diameter of the liner bore would have to be greater than the relatively large outside diameter of the core end connector to enable the hub to slide over the end connector. That would result in a liner which fit loosely about the core.

Objects of the invention are, therefore, to provide an improved control cable and to provide a universal cable which can be readily adapted to differing uses in the field.

Another object of the invention is to reduce the inventory which must be stocked by a distributor supplying control cables to users having diverse needs.

Yet another object of the invention is to provide a control cable having interchangeable end fittings. Specifically, it is an object to provide a core-conduit subassembly which can be adapted in the field to any desired cable type or travel length by connecting interchangeable actuators and hubs.

Another object of the invention is to provide screw end connectors on the ends of the core and conduit for selectively connecting interchangeable actuators and hubs to the cores and conduits respectively.

A further object of the invention is to provide hub liners which are separate from the hub body and interchangeable therewith.

Yet another object of the invention is to provide a universal hub liner which can be adapted for use with differing hub bodies. Specifically, it is an object of the invention to provide grooves or scores in the hub liners so that they may be snapped off to desired lengths.

Yet another object of the invention is to provide a cable assembly wherein the hub liner fits snuggly about the core notwithstanding the interchangeability of the hub.

Another object of the invention is to provide control cable apparatus comprising conduit means for slidably supporting a core, core means slidable supported within the conduit means for relative axial movement therein, hub means generally coextensive with the conduit means having a proximal end removably connected to a distal end of the conduit means, and actuator means generally coextensive with the core means having a proximal end removably connected to a distal end of the core means and a distal end connectable to means for imparting axial movement to the actuator means, said hub means and actuator means being selectively interchangeable with substitute hub means and substitute actuator means respectively, said substitute hub means and substitute actuator means differing from the hub means and actuator means.

Yet another object of the invention is to provide a liner for positioning between a core and a hub in a control cable assembly comprising a longitudinally elongated tubular member with annular score means at spaced longitudinal intervals for selectively breaking off predetermined segments of the tubular member to thereby adjust the length of the liner.

These and other and further objects and features of the invention are apparent in the disclosure which includes the above and below specification and claims and drawings.

DETAILED DESCRIPTION OF THE DRAWINGS

Figure 1:
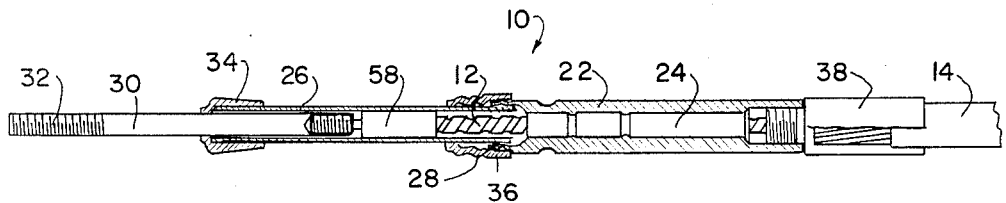
FIG. 1 is a side view, partly in section, of a clamp-type control cable assembly embodying features of the present invention.

Referring to FIG. 1, a control cable assembly embodying features of the present invention is generally indicated by the numeral 10

Figure 2:
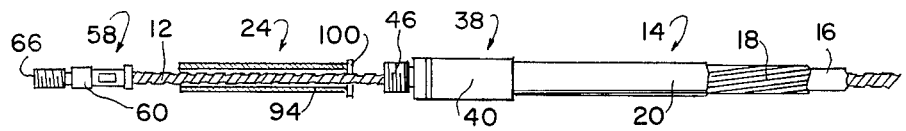
FIG. 2 is a side view, partly in section, of a core-conduit subassembly embodying features of the present invention.

A flexible core 12, preferably formed of a flat wire helically wrapped about a bundle of longitudinally extending round wires, is slidably supported within a flexible conduit 14. The preferred conduit construction, as shown in FIG. 2, includes a liner 16 of low friction material having an axial bore therethrough for receiving the core 12, a plurality of wires 18 helically wrapped in a long pitch about the outer surface of the liner 16, and a coating 20 about the wires 18. The construction of the core 12 and conduit 14 are well known and form no part of the present invention.

Referring again to FIG. 1, it can be seen that a rigid clamp-type hub 22 extends coaxially from the end of the conduit 14 and slidably supports the portion of the core 12 projecting from the end of the conduit 14. A hub liner 24, preferably formed of low friction material, is annularly disposed between the hub 22 and the core 12. A swivel sleeve 26 extends coaxially from the end of the hub 22 and is connected to said end of the hub 22 by a conventional roll groove connection 28 which allows the sleeve 26 to pivot slightly out of alignment with the hub 22. A rigid actuator rod 30 extending coaxially from the end of the core 12 is slidably supported in the swivel sleeve 26. The rod 30 has a threaded end 32 for connection to a source of power (not shown) which imparts axial movement to the rod 30 and core 12. Seals 34 and 36 protect the rod-sleeve junction and sleeve-hub junction respectively.

In a conventional cable assembly, the hub and rod are permanently connected by crimping or other means to the conduit and core respectively. The present invention, on the other hand, provides means for selectively connecting and disconnecting those elements.

Figure 4:
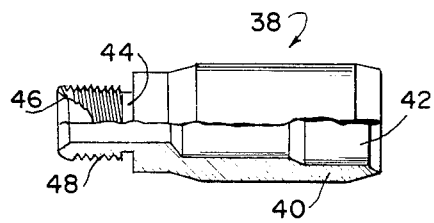
FIG. 4 is a side view, partly in section, of the conduit connector shown in FIGS. 1 and 2.

Referring to FIG. 2, a conduit connector 38 is fixed to the end of the conduit 14. Structural details of the connector 38 are shown in FIG. 4. The connector 38 has a tubular body portion 40 having an axial opening 42 for receiving the end of the conduit 14. The body 40 is permanently fixed to the conduit 14 by bonding the inner surface of the body 40 to the conduit coating 20, by swaging the body 40 into engagement with the conduit coating 20, or by any other conventional means. A reduced diameter neck portion 44 extends coaxially from the end of the body portion 40 and supports a cylindrical head portion 46. Screw threads are formed on the outer side surface 48 of the head portion 46.

Figure 6:
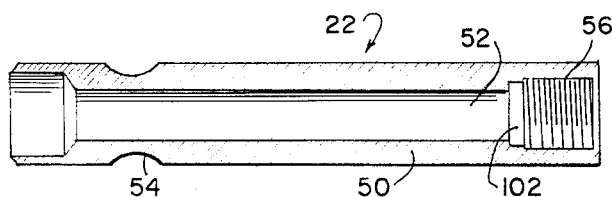
FIG. 6 is a sectional view of the clamp hub shown in FIG. 1.

Structural details of the hub 22 are shown in FIG. 6. The hub 22 has an elongated tubular body 50 having an opening 52 extending axially therethrough. A conventional clamp groove 54 is formed in the outer surface of the body 50 adjacent the distal end of the hub 22. Screw threads 56 formed on the inner surface of the body 50 adjacent the proximal end are configured to mesh with the screw threads formed on the head portion 46 of the conduit connector 38.

As shown in FIG. 1, the hub 22 is connected to the conduit 14 by screwing the proximal end of the hub body 50 over the head portion 46 of the conduit connector 38. It will be appreciated that the connection means permits the hub 22 to be selectively connected to and disconnected from the conduit 14.

Figure 3:
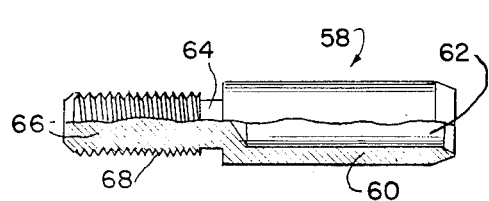
FIG. 3 is a side view, partly in section, of the core connector shown in FIGS. 1 and 2.

Referring again to FIG. 2, a core connector 58 is fixed to the end of the core 12. Structural details of the core connector 58 are shown in FIG. 3. The connector 58 has a tubular body portion 60 with an axial opening 62 formed therein for receiving the end of the core 12. The body 60 is permanently fastened to the core 12 by crimping or by any other suitable means. A reduced diameter neck portion 64 extends coaxially from the end of the body 60 and supports a cylindrical head portion 66 having a threaded outer side surface 68.

Figure 5:
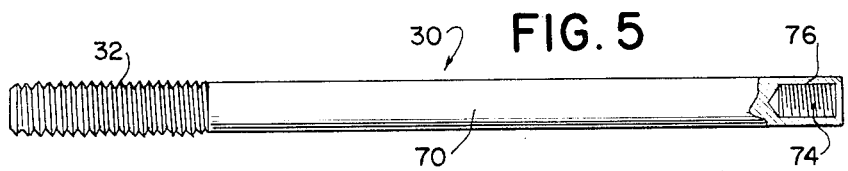
FIG. 5 is a side view, partly in section, of the actuator rod shown in FIG. 1.

Structural details of the rod 30 are shown in FIG. 5. The rod 30 has an elongated cylindrical body 70. Screw threads 32 are provided on the outer surface of the body 70 adjacent the distal end for connecting the rod 30 to a source of power. A tapped axial bore 74 formed in the proximal end of the body 70 has screw threads 76 configured to mesh with the threads on the head portion 66 of the core connector 58.

As shown in FIG. 1, the rod 30 is connected to the core 12 by screwing the proximal end of the rod 30 over the head portion 66 of the core connector 58. It will be appreciated that the connection means permits the rod 30 to be selectively connected to and disconnected from the core 12.

The ability to selectively connect and disconnect the end fittings, i.e., the rod and hub, and the cable, i.e., the core and conduit, results in significant advantages.

One advantage is the ability to readily alter the travel length of the cable assembly 10. The travel length of a control cable is limited by the length of the actuator rod and hub. Hence, the travel length of the cable assembly 10 of the present invention is altered simply by disconnecting the rod 30 and hub 22 from their respective connectors 58 and 38 and connecting a substitute rod and substitute hub to the respective connectors 58 and 38, said substitute rod and substitute hub having different lengths than the original rod 30 and hub 22.

Another advantage is the ability to adapt a single basic cable into various types of cables. Many different types of cables are known. A number of examples were mentioned in the background portion of this specification. As discussed therein, the different types of cables differ primarily in their end fittings. Hence, it will be readily appreciated that the clamp-type cable assembly 10 shown in FIG. 1 could be adapted to a different type of cable assembly by simply disconnecting the rod 30 and clamp-type hub 22 from their respective connectors 58 and 38 and connecting to those connectors 58 and 38 a respective different type of actuator and hub provided with threaded proximal ends similar to the proximal ends of the rod 30 and hub 22. Any person of ordinary skill in the art will readily recognize that such proximal ends can be readily formed on any conventional type of end fitting.

Figure 8:
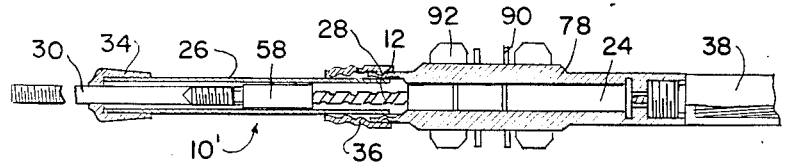
FIG. 8 is a side view, partly in section, of a bulkhead-type control cable assembly embodying features of the present invention.

The cable of the present invention adapted for use as a bulkhead-type control cable is shown in FIG. 8 and indicated generally therein by the numeral 10'.

Figure 9:
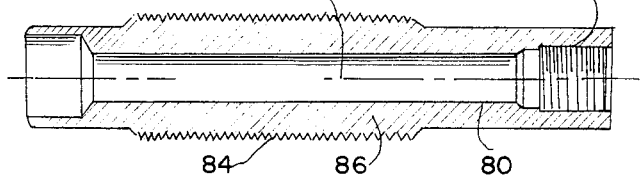
FIG. 9 is a sectional view of the bulkhead hub shown in FIG. 8.
Figure 10:
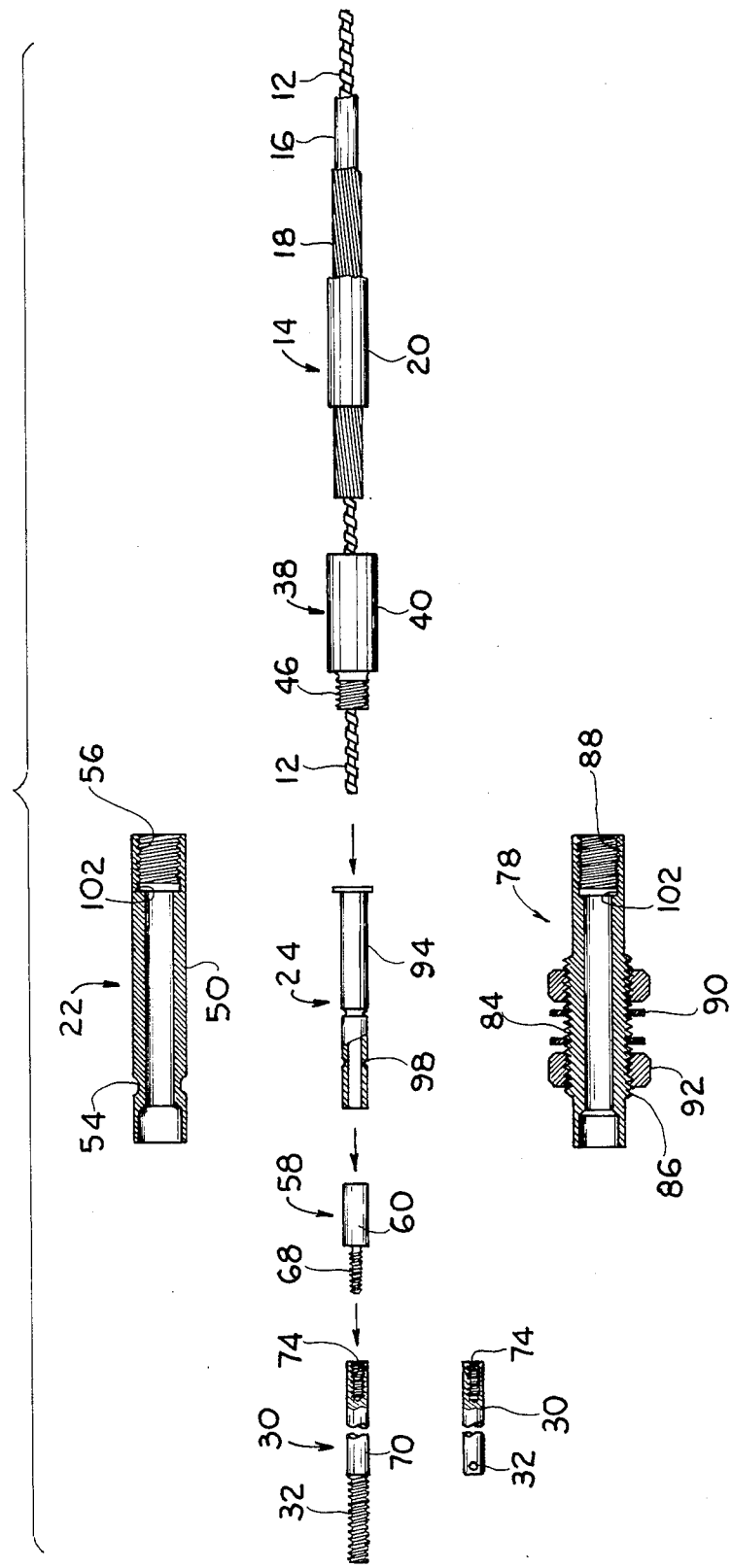
FIG. 10 is an assembly view of the parts shown in FIGS. 1-9.

As shown in FIG. 8, the clamp-type hub 22 has been replaced by a bulkhead-type hub 78. Structural details of the hub 78 are shown in FIG. 9. The hub 78 has an elongated tubular body 80 with an opening 82 extending axially therethrough. Screw threads 84 are provided on the outer surface of a diametrically enlarged medial portion 86 of the body 80. Screw threads 88 provided on the inner surface of the body 80 adjacent the proximal end are identical to the screw threads 56 formed on the proximal end of the clamp-type hub 22 and are thus meshingly engageable with the threaded head 46 of the conduit connector 38. The bulkhead-type hub 78 is designed to be mounted on a wall or bulkhead by extending the hub 78 through an opening in the wall or bulkhead and sandwiching the portion of the wall or bulkhead around the opening between washers 90 and nuts 92 mounted on the outer surface of the medial portion 86 of the hub 78.

It will be appreciated that the actuator used in the bulkhead cable assembly 10' is identical to the rod 30 used in the clamp cable assembly 10.

The interchangeability of end fittings eliminates the need to stock separate inventories of complete cable assemblies for each different type and travel length of control cable. It is only necessary to stock a single inventory of core-conduit subassemblies of the type shown in FIG. 2 and to stock separate inventories of end fittings for each different type and travel length of control cable. This drastically reduces overall inventory requirements.

The interchangeability of end fittings also eliminates the need to replace entire cable assemblies when it is necessary to change one type of installed control cable to another type of control cable. The core-conduit subassembly shown in FIG. 2 would remain permanently installed. The cable type would be changed merely by interchanging end fittings on the installed core-conduit subassembly. This drastically reduces the time and expense of changing control cable types in an installation.

In control cable assemblies, it is desired to provide a liner of low friction material between the hub and the core. Preferably, the liner extends the entire length of the hub. The ability to vary the length of the hub in the cable assembly of the present invention thus necessitates an ability to vary the length of the hub liner.

It is understood that hub liners of proper length may be permanently connected to the hubs so that the length of the liners are automatically varied when hubs are interchanged. However, a problem in applying that scheme to the present invention arises when it is recalled that the hub liner is positioned on the core 12 between the core connector 58 and the conduit connector 38 as shown in FIG. 2. The inside diameter of the liner 24 would have to be greater than the outside diameter of the body portion 60 of the core connector 58 to permit the hub assembly to slide over the core connector 58. A hub liner of such large inside diameter would have an undesirably loose fit about the core 12.

Figure 7:
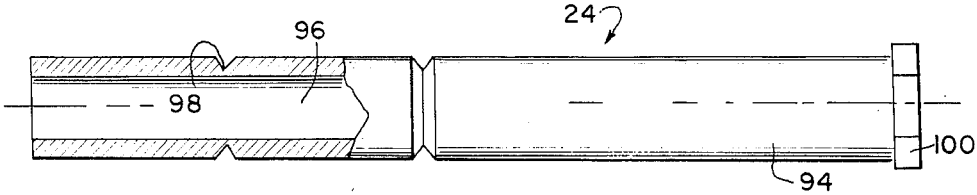
FIG. 7 is a side view, partly in section, of the hub liner shown in FIGS. 1 and 2.

The present invention overcomes that problem by providing a hub liner 24 which is separate from the hub body. Structural details of the liner 24 are shown in FIG. 7. The liner 24 has an elongated tubular body 94 with an opening 96 extending axially therethrough. The opening 96 has a diameter which is slightly greater than the outside diameter of the core 12 and less than the outside diameter of the body portion 60 of the core connector 58. Annular score grooves 98 having V-shaped cross sections are formed at spaced longitudinal intervals on the outer surface of the body 94. The length of the body 94 is adjusted by snapping off segments of the body 94 at the score grooves 98. A radially extending flange 100 is formed on the proximal end of the body 94.

The liner 24 is mounted on the core-conduit subassembly during manufacture. The liner 24 is slid onto the core 12 before the core connector 58 is attached to the core 12. This insures that the liner 24 will have a desirably close fit around the core 12. The core connector 58 is attached to the core 12 after the liner 24 is in proper position.

When the hub 22 is attached to the conduit connector 38, the liner flange 100 is received in a recess 102 at the distal end of the hub threads 56 and is thus forced to seat against the end of the conduit connector head 46 when the hub 22 is screwed onto the conduit connector 38. The liner 24 is thus locked in proper position between the hub 22 and the core 12.

The preferred method for assembling a complete cable assembly embodying features of the present invention can now be understood.

A core-conduit subassembly including a liner, as shown in FIG. 2, is taken from inventory. A rod or actuator of the desired type and having the desired travel length is selected from inventory and threaded onto the core connector 58 until it bottoms on the thread. A segment of the liner 24 is then snapped off at the appropriate groove to adjust the liner 24 to the desired travel length. The snapped off segments are slit and removed from the core 12. A hub of the desired type and having the desired travel length is then selected from inventory, slid over the core connector 58 and hub liner 24, and threaded onto the conduit connector 38 until the threads are bottomed. This completes one end of the cable assembly and by repeating these steps on the other end of the core-conduit subassembly, a complete two-ended control cable assembly of the desired type and travel length is produced.

The type and travel length of the cable assembly is changed by reversing the above steps, i.e., unscrewing the hub from the conduit connector 38 and then unscrewing the actuator from the core connector 58, and then repeating the above steps with a substitute actuator and a substitute hub of desired different type or different travel length.

While the foregoing embodiments have been described with reference to the connectors 58 and 38 being externally threaded and the end fittings being internally threaded for meshing engagement therewith, it is understood that the connectors 58 and 38 could be internally threaded, i.e., provided with tapped bores in the head portion 66 and 46, and the end fittings could be externally threaded, i.e., provided with threaded heads adapted to be meshingly received in the tapped bores.

While the liner 24 has been described as a component of cable assembly having variable end fittings, it is understood that the liner 24 could be used as a stock component for conventional cable assemblies having fixed end fittings.

While the invention has been described with reference to specific embodiments, the exact nature and scope of the invention is defined in the following claims.

I claim:

1. Control cable apparatus comprising conduit means for slidably supporting a core means, core means slidably supported within the conduit means for relative axial movement therein, hub means generally coaxial with the conduit means, conduit connector means for removably connecting a proximal end of the hub means with a proximal end of the conduit means, actuator rod means generally coaxial with the core means, and core connector means removably connecting a proximal end of the actuator rod means to a proximal end of the core means, said hub means having clamping means for connecting the hub means to a fixed object, and the actuator rod means having at a distal end thereof connection means for connection to a movable object, said hub means and said actuator rod means being selectively interchangeable with substitute hub means and substitute actuator rod means respectively, wherein the conduit connector means is fixed to the distal end of the conduit means and is provided with means for selective connection to and disconnection from the hub means, and wherein the conduit connector means comprises a body portion disposed about the distal end of the conduit means, a head portion coaxial with the body portion having a surface provided with screw threads, and a neck portion extending between the body portion and the head portion and being coaxial therewith, the proximal end of the hub means having a surface provided with screw threads configured to cooperate with the screw threads on said head portion.

2. The apparatus of claim 1 wherein the proximal end of the hub means is provided with an axial bore for receiving said head portion.

3. Control cable apparatus comprising conduit means for slidably supporting a core means, core means slidably supported within the conduit means for relative axial movement therein, hub means generally coaxial with the conduit means, conduit connector means for removably connecting a proximal end of the hub means with a proximal end of the conduit means, actuator rod means generally coaxial with the core means, and core connector means removably connecting a proximal end of the actuator rod means to a proximal end of the core means, said hub means having clamping means for connecting the hub means to a fixed object, and the actuator rod means having at a distal end thereof connection means for connection to a movable object, said hub means and said actuator rod means being selectively interchangeable with substitute hub means and substitute actuator rod means respectively, and wherein the core connector means is fixed to the distal end of the core means and is provided with means for selective connection to and disconnection from the actuator means, and wherein the core connector means comprises a body portion disposed about the distal end of the core means, a head portion coaxial with the body portion having a surface provided with screw threads, and a neck portion extending between the body portion and the head portion and being coaxial therewith, the proximal end of the actuator means having a surface provided with screw threads configured to cooperate with the screw threads on said head portion.

4. The apparatus of claim 3 wherein the proximal end of the actuator means is provided with an axial bore for receiving said head portion.

* * * * *